Aug. 25, 1970 HANS-JOACHIM BODE ET AL 3,525,649

METHOD AND MEANS FOR INCREASING THE CRITICAL CURRENT DENSITY OF SUPERCONDUCTING LAYERS HAVING β-TUNGSTEN CRYSTAL STRUCTURES

Filed Aug. 29, 1966 4 Sheets-Sheet 3

United States Patent Office 3,525,649
Patented Aug. 25, 1970

3,525,649

METHOD AND MEANS FOR INCREASING THE CRITICAL CURRENT DENSITY OF SUPERCONDUCTING LAYERS HAVING β - TUNGSTEN CRYSTAL STRUCTURES

Hans-Joachim Bode, Erlangen, and Karl Wohlleben, Eltersdorf, Germany, assignors to Siemens Aktiengesellschaft, Erlangen, Germany, a corporation of Germany Filed Aug. 29, 1966, Ser. No. 575,737
Claims priority, application Germany, Apr. 7, 1966, S 103,079
Int. Cl. C22c *27/00;* C22f *3/00*
U.S. Cl. 148—4 8 Claims

ABSTRACT OF THE DISCLOSURE

Described is a method of increasing the critical current density of superconducting intermetallic components having β-tungsten crystal structure. The method comprises subjecting layers of intermetallic superconducting compounds having β-tungsten crystal structure to proton irradiation of an energy content from about 100 kev. to several mev. at a proton flow density and for an irradiation period conjointly corresponding to an integrated proton flow of about $10^{15}$ to $10^{18}$ protons per $cm.^2$.

Our invention relates to a method and to means for increasing the critical current density of layers consisting of superconducting intermetallic compounds having β-tungsten crystalline structure, and more particularly to improving such layers of corpuscular radiation.

A large number of intermetallic compounds having β-tungsten crystalline structure possess good superconducting qualities. Particularly, the intermetallic compound niobium-tin ($Nb_3Sn$) is distinguished by a high critical temperature of 18.2° K., a high critical magnetic field of approximately 200 kilo-oersteds at 4.2° K., and a high critical current density. Among the other intermetallic compounds having β-tungsten crystalline structure and known as good superconductors, are the following compounds of niobium, vanadium and tantalum: tantalum-tin ($Ta_3Sn$), niobium-gallium ($Nb_3Ga$), niobium-aluminum ($Nb_3Al$), vanadium-gallium ($V_3Ga$), vanadium-silicon ($V_3Si$) and vanadium-tin ($V_3Sn$). These compounds are suitable, for example as material for superconducting coils for producing of high magnetic fields, or as material for shielding or confinement of magnetic fields. Because of their extreme brittleness and poor mechanical machinability, these compounds are preferably produced in the form of layers, for example by precipitation from the gaseous phase upon suitable substrates or by indiffusion of the lower melting elemental constituent into a substrate consisting of the constituent having the higher melting point. The substrates thus provided with superconducting coatings may consist of wires or tapes, or may have any other shape suitable for superconducting components, such as the shape of plates or cylinders.

Although the intermetallic superconducting compounds, particularly the compound niobium-tin, possess high critical current densities and hence convert from superconductivity to the state of normal conductance only when subjected to relatively high current intensities, it is often desirable to further increase these critical current densities, for example to afford applying higher current intensities to the supercoducting layers in superconducting coils for producing magnetic fields, in order to reduce the amount of material required.

It is known that the critical current densities of niobium-tin layers precipitated from the gaseous phase can be increased by irradiation with neutrons. Such radiation, however, provides for a sufficient neutron dosage only if carried out in a nuclear reactor and if the irradiation periods are very long. Furthermore, the irradiated material becomes radioactive so that it can be used only after prolonged storage. In addition, the critical current density of niobium-tin layers could at best be doubled by such application of neutron radiation.

It is an objecet of the invention to devise a technically applicable method which avoids the above-mentioned disadvantages and which also affords a higher increase in critical current density of the superconducting layers.

To this end, and in accordance with our invention, we subject layers of superconducting intermetallic compounds, having β-tungsten crystalline structure, to irradiation by protons.

The method according to the invention does not require the use of a nuclear reactor. Applicable for irradiating the superconducting layers are ordinary proton accelerators, for example, a Van de Graaff accelerator. The layers do not become radioactive and can be further fabricated or used immediately upon completion of the radiation treatment. It has further been found that with proton irradiation the required periods of treatment are shorter than with neutron irradiation, and further that proton irradiation permits attaining an increase in critical current density of the superconducting layers by the factor 3 to 6.

The favorable effect of proton irradiation upon the critical current density of superconducting layers is wholly surprising. The prevailing theory explains the increase in critical current desnity of $Nb_3Sn$ layers due to neutron radiation by assuming that there occurs the formation of large displacement cascades which act as pinning centers for the flow vortices in the superconducting layers. The neutrons entering by radiation are first scattered at the nuclei of the lattice atoms. If during such scattering the energy supplied to an atom nucleus exceeds a given threshold value, the so-called displacement energy, then this atom nucleus is displaced from its regular lattice locality to an intermediate locality and there occurs a Frenkel defect consisting of the empty locality and the lattice intermediate atom. The primarily displaced atom may collide with other lattice atoms and thus cause displacement of the latter so that secondarily displaced atoms will result. In its further continuance, this phenomenon leads to the formation of a so-called displacement cascade which may consist of a large number (up to 1000 and more) Frenkel defects. Relative to the effect of protons upon crystal lattices, it is known that the probability of causing displacement cascades is much smaller than with neutrons and that uniformly distributed singular defects are preponderant. According to the prevailing view, however, only rather large lattice disturbances and not individual defects are effective as pinning centers for flow vortices. In summary, a large increase in critical current density of superconducting layers by proton irradiation was not to be expected.

The invention affords producing not only individual superconducting layers of intermetallic compounds having β-tungsten structure, but also several such layers joined to a single integral structure, for example sandwich layers consisting of respective niobium and $Nb_3Sn$ layers jointly forming a tape or part of a tape.

The proton energy applied in accordance with the invention may be varied within wide limit. Preferred for irradiation are protons whose energy is between the approximate values of 100 kev. and several mev., for example 5 mev. The proton current density and the irradiation time are preferably so dimensioned that the integrated proton flow is approximately $10^{15}$ to $10^{18}$ protons per $cm.^2$.

The integrated proton flow is the proton current density integrated over the irradiation time.

According to a preferred mode of the method according to the invention, the proton energy is so chosen that the protons completely penetrate through the superconducting layers being irradiated. Under such conditions, the protons become decelerated only in the support or substrate carrying the layers. This has the result that any defects produced by the irradiation are distributed approximately homogeneously through the entire cross section of the superconducting layer, and that therefore the increase in critical current density is uniformly distributed over the entire cross section of the layer. A particularly economical increase in critical current density can be achieved by selecting the proton energy sufficiently high to have the protons issue from the last irradiated layer at a kinetic energy of at least 100 kev. This exit energy is dependent upon the entering energy of the protons as well as upon the nuclear charge number, the density and thickness of the material being traversed by irradiation. The entering energy of the protons, that is the energy with which the protons must be shot onto the material, can be readily calculated in dependence upon the layer thickness and the composition of the material to be penetrated by the irradiation, the calculation being based upon the known formulas for the differential energy loss of protons in material (see, for example, the article of Ward Whaling in "Handbuch der Physik," vol. 34, p. 193 ff., Berlin-Gottingen-Heidelberg, 1958, published by Springer-Verlag).

If no particular importance is placed upon homogeneous distribution of lattice defects, the entering energy of the protons may also be so chosen that the end of the proton travel distance is still located within the superconducting layer being irradiated, so as to take advantage of the phenomenon that at the end of proton travel the generation of defects by the protons reaches a pronounced maximum. Such a mode of irradiation is desirable for some technological applications. The entering energy of the protons required for attaining a given penetrating depth in the layer being irradiated can likewise be readily determined with the aid of the above-mentioned known formulas relating to the differential energy loss of protons in material.

We have further discovered that when employing the method of the invention, a particularly large increase in critical current density of the layers penetrated by irradiation can be attained if the integrated proton flow stays within an optimal range which shifts toward higher integrated proton-flow values with increasing proton energy. In a preferred embodiment of the method according to the invention, this phenomenon is utilized by effecting the irradiation of $Nb_3Sn$ layers with a proton current density and a radiation time corresponding to the following equation:

$$N_p = a \cdot 10^{16} \frac{E_p}{2.8 \text{ mev.}} \cdot \frac{\text{protons}}{\text{cm.}_2}$$

wherein $N_p$ denotes the integrated proton flow, $E_p$ the median proton energy in the radiation-penetrated layer in mev. and $a$ is a number between 5 and 12. This semi-empirical formula indicates the dependency of the optimal integrated proton flow upon the median proton energy in the radiation-penetrated layer with particularly good accuracy if the energy of the protons when entering into the layer is not more than 4 times larger than the energy of the protons when leaving the penetrated layer. The formula is calculated from the equation for the scattering cross section of Rutherford scattering, employing the optimal empirical values found from the irradiation of niobium-tin layers. Similar relations can be set up analogously for other superconducting intermetallic compounds.

As will be seen from the formula, the optimal integrated proton flow increases with an increase in average proton energy within the radiation-penetrated layer. The average proton energy depends upon the entering energy of the protons and upon the layer thickness. When increasing the entering energy, therefore, the proton flow density or the irradiation time must be increased in order to attain the optimal value of integrated proton flow. By selecting a lower entering or shooting energy of the protons, however, the proton flow density can be reduced and the irradiation time be shortened. The choice of a lowest feasible entering energy is in some cases preferable because it affords using shorter irradiation periods, and also because the irradiated layers become less strongly heated at lower proton flow densities than at higher densities.

The irradiation of the superconducting layers with protons according to the invention is preferably performed in high vacuum so that the loss of protons due to scattering prior to entering into the superconducting layer does not become excessive. Tapes and wires coated with superconducting layers may be pulled by means of a roller mechanism along a travel path extending beneath the proton beam. Larger components carrying the superconducting layers may be fixedly mounted in the vacuum space and then be scanned in a suitable manner by the proton beam. In order to prevent undesired healing of the lattice defects produced by the radiation in the layers, such healing being otherwise to be expected on account of the generated heat, the layers or the appertaining substrates or supports are preferably cooled. This may be done, for example, by placing the irradiated objects upon cooled surfaces or other heat sinks. For simplicity, the objects to be irradiated may be connected to ground potential.

The invention will be further described with reference to the accompanying drawings, in which.

Presently described as an example of the method according to the invention is the irradiation of $Nb_3Sn$ layers. The $Nb_3Sn$ layers were produced as follows. Niobium tubes of 30 mm. length, an inner diameter of 4.5 mm. and an outer diameter of 6 mm., were electrolytically coated on the outside with a tin layer of approximately 4 $\mu$m. thickness. The coated tubes were heated in high vacuum, the vacuum pump kept continuously running, to a temperature of 975° C. for 4 hours. As a result, the tin diffused from the coating into the niobium material of the tube and formed therewith an $Nb_3Sn$ layer of approximately 7 $\mu$m. thickness.

Figure 1:
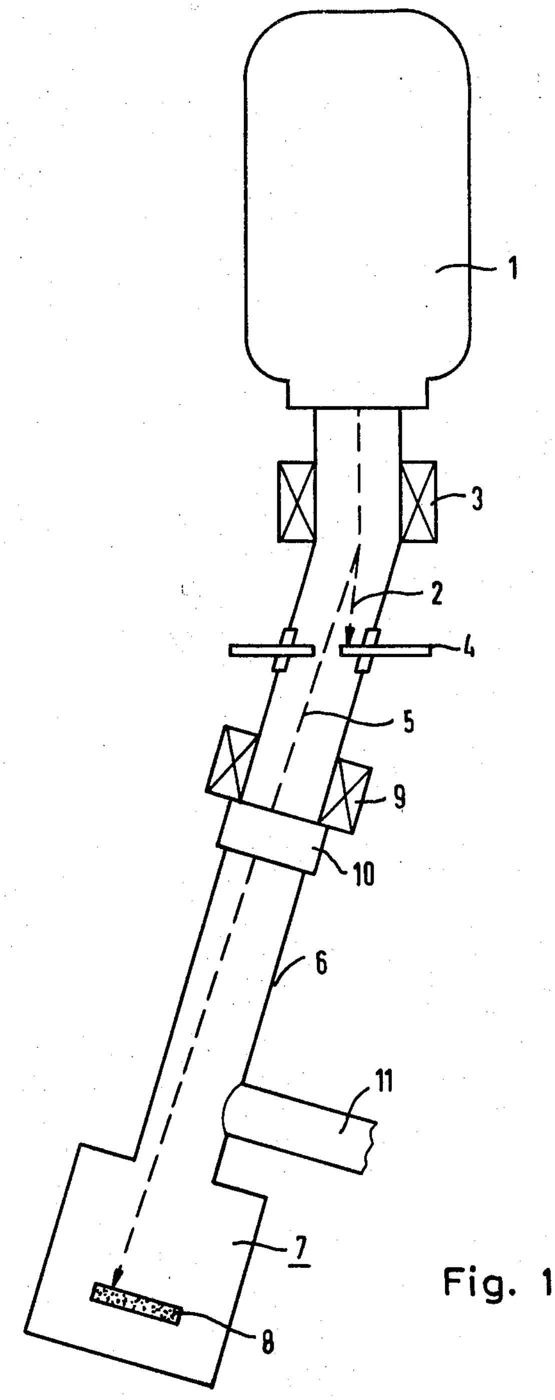
FIG. 1 shows schematically a sectional view of equipment for irradiating superconducting layers in accordance with the method of the invention.

Specimens taken from the tubes coated with the now superconducting layer were subjected to proton irradiation with the aid of the equipment illustrated in FIG. 1. A 3 mev. Van de Graaff accelerator 1 was used for accelerating the protons. After separating the molecule ions 2 with aid of a separating magnet 3 and a diaphragm 4, the proton beam 5 leaving the accelerator 1 was directed through the tube 6 onto the specimen 8 mounted in the irradiation chamber 7. The proton beam was periodically deflected to pass repeatedly over the niobium tube (specimen) carrying the $Nb_3Sn$ layer to be irradiated.

The scanning movement was imparted to the beam with the aid of a magnetic alternating field of 200 Hertz (c.p.s.) produced by means of a magnet 9, and with the aid of a magnetic alternating field of 5 c.p.s. extending at an angle to the first field and produced by a second magnet 10. During irradiation the chamber 7 was evacuated through a lateral nipple pipe 11 to a vacuum of less than $2 \cdot 10^{-5}$ torr with the aid of a vacuum pump (not shown) communicating with the nipple tube 11.

Figure 2:
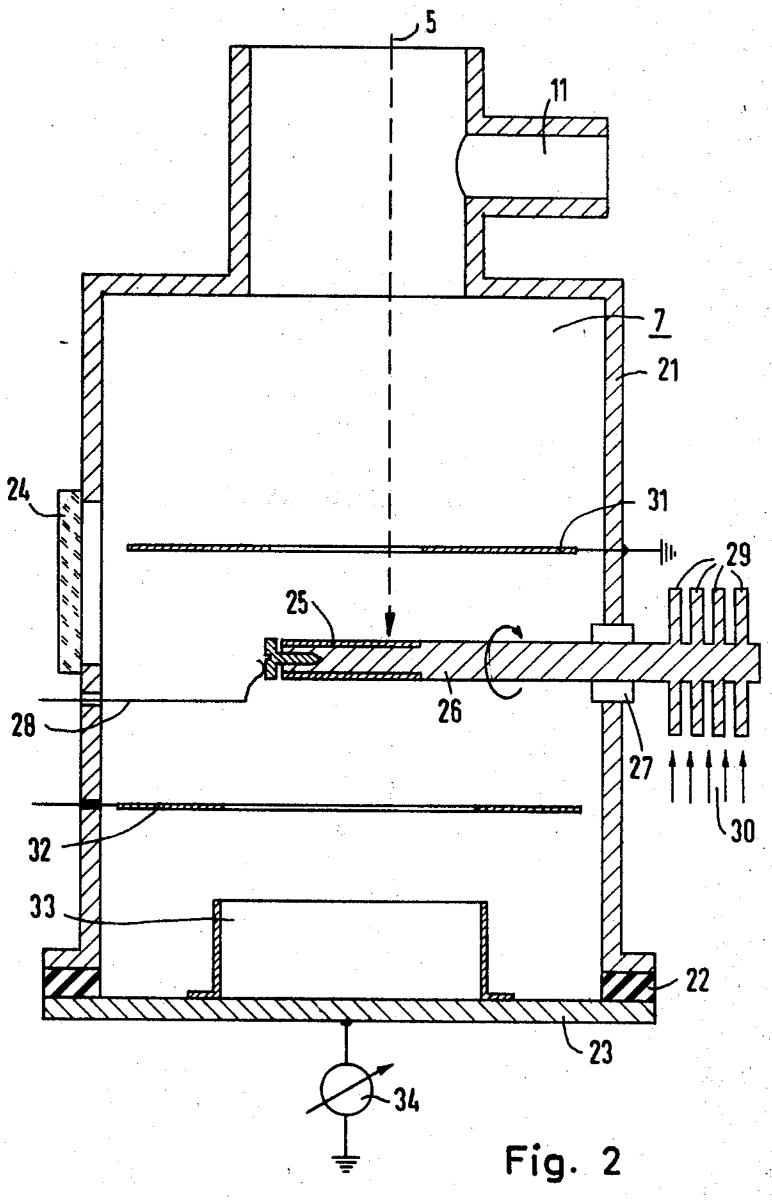
FIG. 2 is a schematical section of an irradiation chamber which forms part of the equipment according to FIG. 1.

The irradiation chamber 7 is shown more in detail in FIG. 2. It comprises a housing 21 of aluminum connected to ground potential. The bottom of the housing is formed by a plate 23 of stainless steel and is insulated from the housing proper by an insulated gasket ring 22. The housing 21 is provided with an observation window 24. The specimen 25, constituted by a niobium tube which carries the $Nb_3Sn$ layer to be irradiated, is fixedly stuck upon a holder 26 of copper which passes rotatably through a sealed opening from the irradiation chamber to the outside where it is connected to a motor (not illustrated).

The heat generated during irradiation is continuously dissipated through the holder 26 of copper. For this purpose, the holder is provided with cooling vanes 29 outside the irradiation chamber. A current of compressed air, indicated at 30, is continuously blown against the vanes 29 to secure proper cooling.

Mounted in the irradiation chamber above the specimen holder is a diaphragm 31 consisting of stainless steel. The diaphragm 31 is connected to ground potential. A counter-field electrode 32, likewise consisting of stainless steel, is mounted beneath the specimen holder and is maintained at a negative potential for example of −500 volts. A Faraday cage 33 is provided on the base plate 23 of the radiation chamber. This cage catches the protons not impinging upon the specimen 25. A current integrating device 34 is connected between ground and base plate 23 for determining the integrated proton flow.

For uniform irradiation from all sides, the niobium tube was continuously rotated at a speed of 1 revolution per minute. The proton flow density, relative to the cross section of the niobium tube, was at 1.6 $\mu$a./cm.$^2$. This corresponds to an area loading of 4.8 watt/cm.$^2$. For measuring the heating of the niobium tube during irradiation, a thermocouple 28 was remained in frictional contact with the specimen holder directly beside the niobium tube during the entire irradiation period. The temperature of the niobium tube was estimated at about 100° C., based upon the temperature measurement effected with the aid of the thermocouple 28.

For investigating the increasing critical current density in dependence upon the integrated proton flow, the irradiation was repeatedly interrupted, and the critical current of the irradiated specimen was measured in magnetic fields of up to 50 kilo-oersted strength. An integrated proton flow of $10^{16}$ protons per cm.$^2$ relative to the surface of the specimen tube, required an irradiation time of 52 minutes at a proton flow density of 1.6 $\mu$a./cm.$^2$. The average proton energy in the $Nb_3Sn$ layer of 7 $\mu$m. thickness was about 2.8 mev. The displacement energy of the lattice atoms was estimated at 20 to 30 ev.

Figure 3:
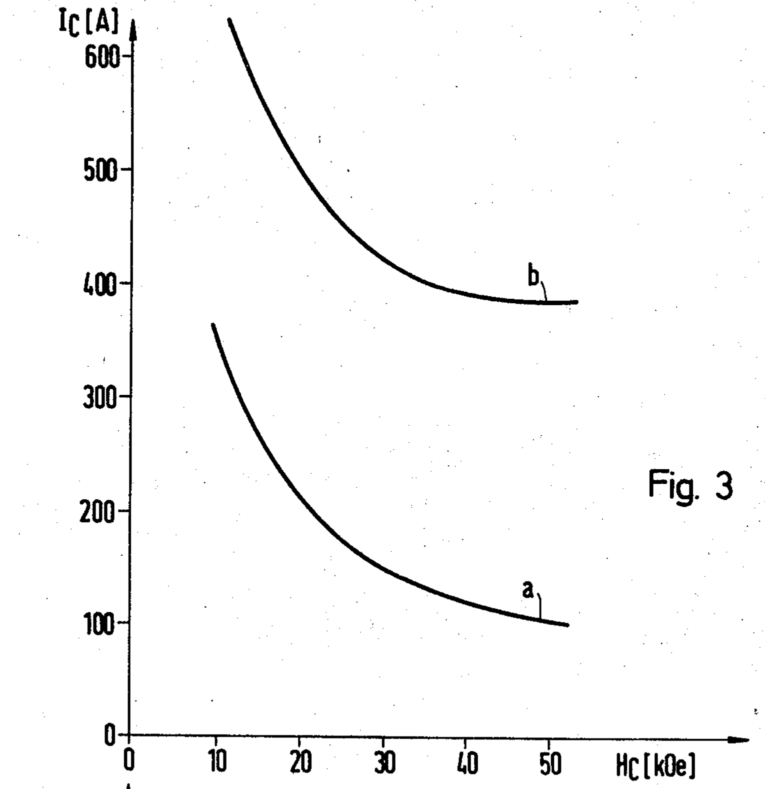
FIG. 3 is an explanatory graph showing the $I_cH_c$ curves for an $Nb_3Sn$ layer prior to and after irradiation with protons.
Figure 4:
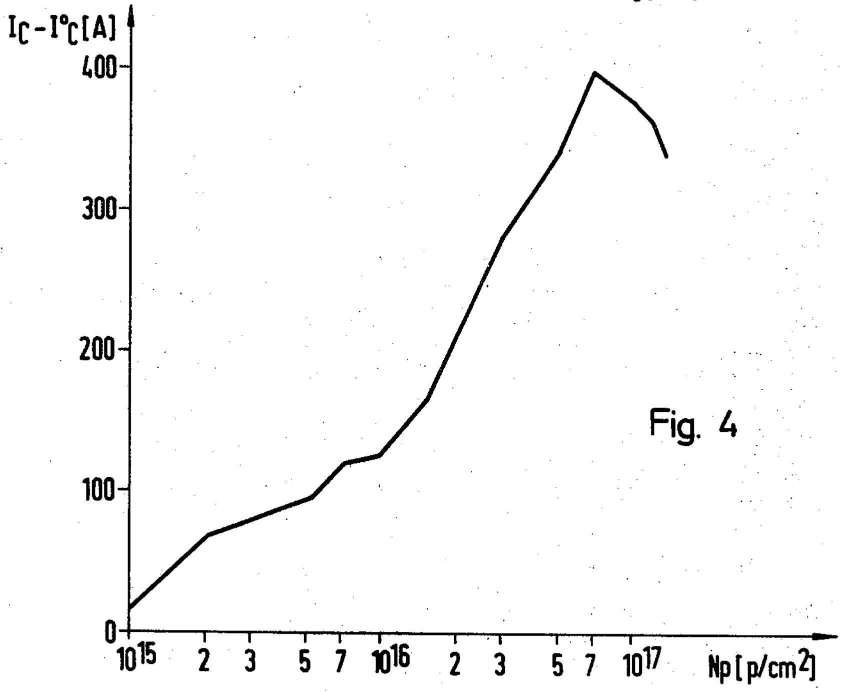
FIG. 4 is an explanatory graph showing the increase in critical current intensity of an $Nb_3Sn$ layer irradiated with protons, the current intensity being measured in a magnetic field of 50 kilo-oersted in dependence upon the integrated proton flow.

The measuring results obtained with the embodiment described in the foregoing are represented by the graphs shown in FIGS. 3 and 4.

The curve *a* in FIG. 3 indicates the critical current intensity of a tube carrying a niobium-tin layer, prior to irradiation. Curve *b* shows the critical current intensity after irradiation by an integrated proton flow of $7 \cdot 10^{16}$ protons per cm.$^2$, in dependence upon an external magnetic field. The critical current intensity $I_c$ is indicated on the ordinate in amps, the critical magnetic field $H_c$ on the abscissa in kilo-oersteds. The curves were obtained from measurements made as follows. A specimen tube was placed into an increasing magnetic field directed parallel to the tube axis of the specimen. The shielding field in the interior of the specimen tube was continuously recorded. The critical current was then calculated from the measured field strength. The curves indicate that the critical current intensity was greatly increased over the entire magnetic field range. Especially at a magnetic field of 50 kilo-oersteds there resulted an increase by the factor 4.

FIG. 4 relates to a different specimen tube which was treated similarly. The graph indicates increase in critical current versus integrated proton flow at a magnetic field of 50 kilo-oersteds. Indicated on the ordinate on a linear scale is the difference $(I_c - I_c^0)$ in amps between the critical current $I_c$ after irradiation and the critical current $I_c^0$, prior to irradiation. The abscissa indicates on a logarithmic scale the integrated proton flow $N_p$ in protons per cm.$^2$. The proton current density during irradiation was 1.6 $\mu$a./cm.$^2$. The average proton energy within the layer was 2.8 mev. The critical current intensity at 50 kilo-oersteds prior to irradiation was 83 amps. The curve in FIG. 4 shows that with an integrated proton flow of about 5 to $12 \cdot 10^{16}$ protons per cm.$^2$ there occurs a particularly great increase in critical current, namely by the factor 5 to 6. Consequently, the integrated proton flow exhibits an optimal range for maximum increase in critical current, although with a lower or higher integrated proton flow, the obtainable increase in critical current is still appreciable. Toward very high proton flow values, however, the critical current again declines.

Results similar to those represented by FIGS. 3 and 4 have been observed with a large number of other specimens subjected to varied irradiation, especially different amounts of proton flow density. In these measurements, the median proton energy within the radiation-penetrated layer was like-wise approximately 2.8 mev. It was found that under these conditions the optimal value of integrated proton flow was also approximately 5 to $12 \cdot 10^{16}$ protons per cm.$^2$.

By heating the irradiated specimens it was ascertained that the increase in critical current intensity was reliably stable up to a temperature of 600° C.

Aside from niobium tubes coated with $Nb_3Sn$ layers, irradiation tests were made with sandwich structures composed of niobium layers, $Nb_3Sn$ layers and tin layers in the form of tapes. Each tape contained four $Nb_3Sn$ layers of approximately 2 $\mu$m. thickness each. The total thickness of the tape was about 44 $\mu$m. The tests made with these tapes also exhibited a corresponding increase in critical current intensity due to proton irradiation.

Figure 5:
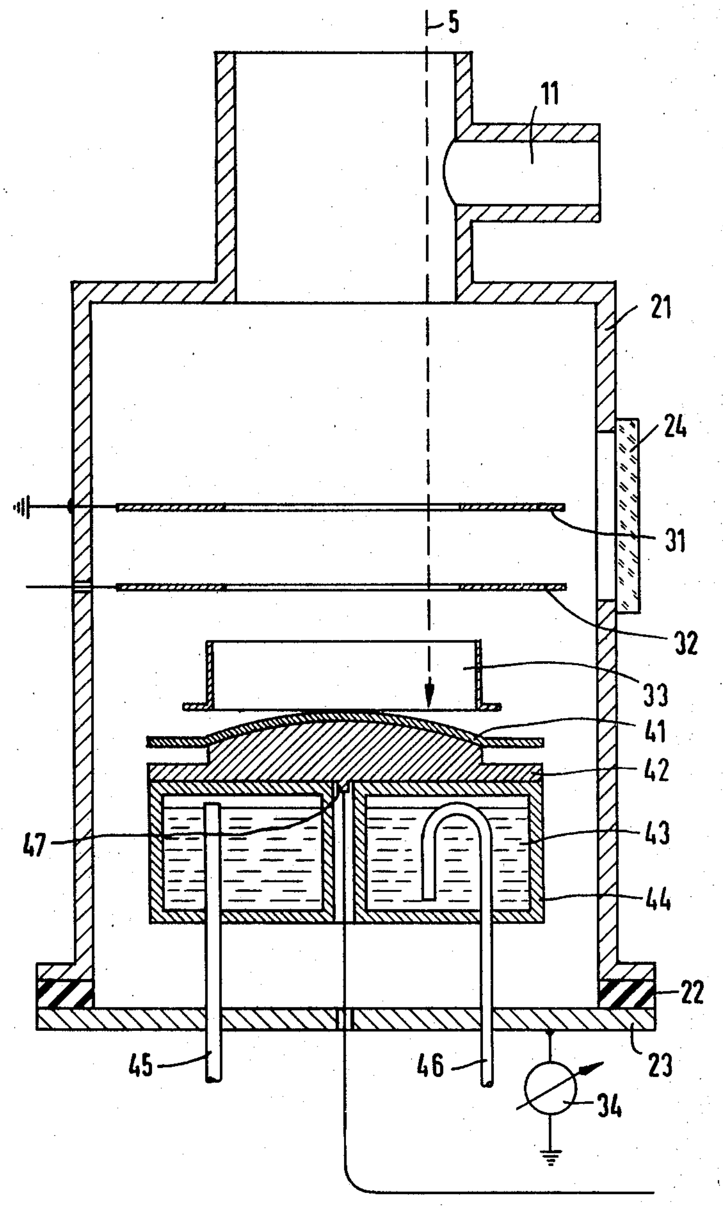
FIG. 5 shows schematically and in section another irradiation chamber suitable for use in equipment otherwise corresponding to FIG. 1.

An irradiation chamber for treating such tapes is illustrated in FIG. 5. The general construction of the chamber is similar to that described above with reference to FIG. 2, corresponding components being designated by the same reference characters in both illustrations. The tape 41, containing the $Nb_3Sn$ layers, is placed upon a specimen holder 42 consisting of copper. The specimen holder 42 is cooled during radiation with the aid of liquid nitrogen 43 contained in a cryostat vessel 44 likewise consisting of copper, which is in good heat conducting connection with the specimen holder 42. Tubes 45 and 46 serves to fill and drain the cryostat. The temperature measurement during irradiation is performed with the aid of a thermocouple 47 located in the specimen holder 42. In this embodiment the counter electrode 32 and the Faraday cage 33 are mounted above the specimen holder.

It will be recognized from the equipment described above and from the processes and tests carried out with the aid of such equipment, that the invention affords economically obtaining a high increase in critical current intensities in layers of intermetallic superconductive compounds. Depending upon the substrates, the superconducting layers treated according to the invention, are suitable for use in superconducting magnets as required for the production of high-intensity magnetic fields, as components for shielding or confining of magnetic fields, as well as for components serving electrical and various other purposes.

We claim:

1. The method of increasing the critical current density of superconducting intermetallic components having β-tungsten crystal structure, which comprises subjecting layers of intermetallic superconducting compounds having β-tungsten crystal structure to proton irradiation of an energy content from about 100 kev. to several mev. at a proton flow density and for an irradiation period conjointly corresponding to an integrated proton flow of about $10^{15}$ to $10^{18}$ protons per $cm.^2$.

2. The method according to claim 1, wherein the proton energy of said irradiation is sufficiently high to have the protons completely penetrate through the superconducting layers.

3. The method according to claim 1, which comprises completely penetrating the irradiation layers by proton radiation at a proton energy amounting at least to about 100 kev. behind the last penetrated layer.

4. The method according to claim 1, which comprises subjecting layers of superconducting $Nb_3Sn$ layers to penetrating proton radiation at a proton flow density and for an irradiation period conjointly corresponding to a time-integrated proton flow $N_p$ approximately in accordance with the formula:

$$N_p = a \cdot 10^{16} \frac{E_p}{2.8\text{ mev.}} \cdot \frac{\text{protons}}{\text{cm.}^2}$$

wherein $E_p$ denotes the median proton energy in the radiation-penetrated layer in mev. and $a$ is a number between 5 and 12.

5. The method according to claim 1, which comprises performing the proton irradiation of the superconducting layers in high vacuum.

6. The method according to claim 1, which comprises cooling the superconducting layers during proton irradiation.

7. The method according to claim 1, wherein said superconducting layers are formed of niobium-tin ($Nb_3Sn$).

8. The method according to claim 1, wherein said superconducting layers are formed of substance selected from the group consisting of $Ta_3Sn$, $Nb_3Ga$, $Nb_3Al$, $V_3Ga$, $V_3Si$ and $V_3Sn$.

References Cited

UNITED STATES PATENTS

| | | | |
|---|---|---|---|
| 2,666,814 | 1/1954 | Shockley | 148—1.5 |
| 2,863,812 | 12/1958 | Graham | 250—49.5 |
| 2,968,723 | 1/1961 | Steigerwald | 148—13 |
| 3,346,425 | 10/1967 | Fleischer | 148—4 |
| 3,370,167 | 2/1968 | Sterk | 250—49.5 |

FOREIGN PATENTS

| | | |
|---|---|---|
| 789,456 | 1/1958 | Great Britain. |

CHARLES N. LOVELL, Primary Examiner

U.S. Cl. X.R.

148—1; 250—49.5